(12) United States Patent
Chen et al.

(10) Patent No.: US 9,481,985 B1
(45) Date of Patent: Nov. 1, 2016

(54) FAUCET WITH SAFE OPERATING MODE ON A HOT SIDE THEREOF

(71) Applicants: Jui-Chien Chen, Lugang Township, Changhua County (TW); Jui-Ching Chen, Lugang Township, Changhua County (TW)

(72) Inventors: Jui-Chien Chen, Lugang Township, Changhua County (TW); Jui-Ching Chen, Lugang Township, Changhua County (TW)

( * ) Notice: Subject to any disclaimer, the term of this patent is extended or adjusted under 35 U.S.C. 154(b) by 0 days.

(21) Appl. No.: 14/706,652

(22) Filed: May 7, 2015

(51) Int. Cl.
*F16K 31/60* (2006.01)
*E03C 1/04* (2006.01)

(52) U.S. Cl.
CPC ........... *E03C 1/0412* (2013.01); *F16K 31/605* (2013.01)

(58) Field of Classification Search
CPC .... E03C 1/0412; E03C 1/041; E03C 1/0411; F16K 31/602; F16K 31/605
USPC ............................................ 137/315.15, 801
See application file for complete search history.

(56) References Cited

U.S. PATENT DOCUMENTS

| | | | |
|---|---|---|---|
| 8,567,430 B2 * | 10/2013 | Allen et al. ........... | F16K 31/602 137/315.15 |
| 2011/0000564 A1 * | 1/2011 | Corbin et al. ...... | F16K 11/0787 137/625.4 |

* cited by examiner

*Primary Examiner* — Kevin Lee
(74) *Attorney, Agent, or Firm* — Egbert Law Offices, PLLC

(57) ABSTRACT

A faucet has a main body, a cold water control device mounted onto a first end of the main body, a hot water control device mounted onto a second end of the main body and an outlet device mounted onto a top of the main body. The cold water control device selectively guides cold water flowing into the main body and flowing out from the outlet device. A drive device is laterally mounted onto the hot water control device for driving the hot water control device to selectively guide hot water flowing into the main body and flowing out from the outlet device. The drive device has a first magnet secured to a tube in a casing of the drive device and a second magnet disposed on a clutch shaft of the drive device to provide a repelling force for the clutch shaft.

20 Claims, 11 Drawing Sheets

FAUCET WITH SAFE OPERATING MODE ON A HOT SIDE THEREOF

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a faucet, and more particularly to a faucet with a safe operating mode on a hot side thereof.

2. Description of Related Art Including Information Disclosed Under 37 CFR 1.97 and 37 CFR 1.98

A variety of faucet structures have been developed so far, such as faucets on cooking tables that are mostly designed with a single outlet. However, cooking tables for many users are currently equipped with water filters (e.g. water purifiers) for convenient operation, making it difficult to provide an orderly and aesthetically-pleasing environment. For this reason, an improved faucet for a dual-outlet system has been developed. The feature is that a dual-outlet tube in the faucet structure is linked separately to the pipelines of both a tap water system and a water filter. Thus, the tap water system and water purifier are combined into the same faucet structure.

As for the typical faucet structure of the dual-outlet system, the pipelines of both the tap water system and water filter are assembled into the same outlet tube of the faucet, and the control switches of tap water and purified water are assembled at both sides of the faucet.

However, there are shortcomings are observed during actual application. First, the outlet of purified water is limited to the same outflow position as the tap water, leading to inconvenient and inflexible operation. Second, the outlets of new water filters are designed with multiple water supply modes (e.g. cold water, hot water and bubbled water), so the aforementioned design of a typical structure will make it difficult to accommodate several pipelines in a single space and to assemble the switching mechanism easily. Third, in case of damage of any outlet system of the typical faucet structure, maintenance or replacement is inconvenient since the possibility of replacement is not taken into consideration in overall structural design The present invention has arisen to mitigate and/or obviate the disadvantages of the conventional faucet.

BRIEF SUMMARY OF THE INVENTION

The main objective of the present invention is to provide an improved faucet that provides a safe operating mode to the hot side thereof.

To achieve the objective, the faucet in accordance with the present invention comprises a main body, a cold water control device mounted onto a first end of the main body for selectively guiding cold water flowing into the main body, a hot water control device mounted onto a second end of the main body for selectively guiding hot water flowing into the main body, an outlet device mounted onto a top of the main body for guiding the water in the main body flowing out of the main body and a drive device laterally mounted onto the hot water control device for driving the hot water control device to selectively guide hot water flowing into the main body and flowing out from the outlet device. The hot water control device includes a control valve longitudinally mounted into the main body and a polygonal shaft rotatably extends from the control valve such that a hat water passage is opened or closed when the polygonal shaft is rotated. The drive device includes a casing laterally and securely mounted onto the polygonal shaft for driving the polygonal shaft, the casing having a tube radially extending from the casing and communicating with an interior of the casing, wherein a first magnet is secured in the tube. A clutch shaft extends through the tube and is reciprocally moved relative to the tube, wherein the clutch shaft is selectively engaged to the main body to prevent the drive device from an error operation. A second magnet is disposed on the clutch shaft, wherein the first magnet and the second magnet repel each other and the repelled first magnet and second magnet form a restituting force for the clutch shaft when the clutch shaft inwardly moved relative to the casing. The casing can be freely rotated to drive the polygonal shaft for guiding hot water flowing into the main body when the clutch shaft is disengaged from the main body, and clutch shaft is automatically engaged to the main body by using a repel force between the first magnet and the second magnet when the clutch shaft is moved to its original position.

The non-contact (repel) force between the first magnet and the second magnet is provided to the clutch shaft and used as a power source to automatically lock the drive device. Consequently, the conventional spring structure is unnecessary to the drive device of the present invention such that the direct friction between elements is disappeared and the use life of the faucet is lengthened. The coiled spring is twisted when the drive device is rotated such that the clutch shaft automatically moved to its original locked position when the user releases the drive device after using hot water. Consequently, the faucet in accordance with the present invention not only provides a safe control mode but also provides a saving-water control mode.

Further benefits and advantages of the present invention will become apparent after a careful reading of the detailed description with appropriate reference to the accompanying drawings.

DETAILED DESCRIPTION OF THE INVENTION

Figure 1:
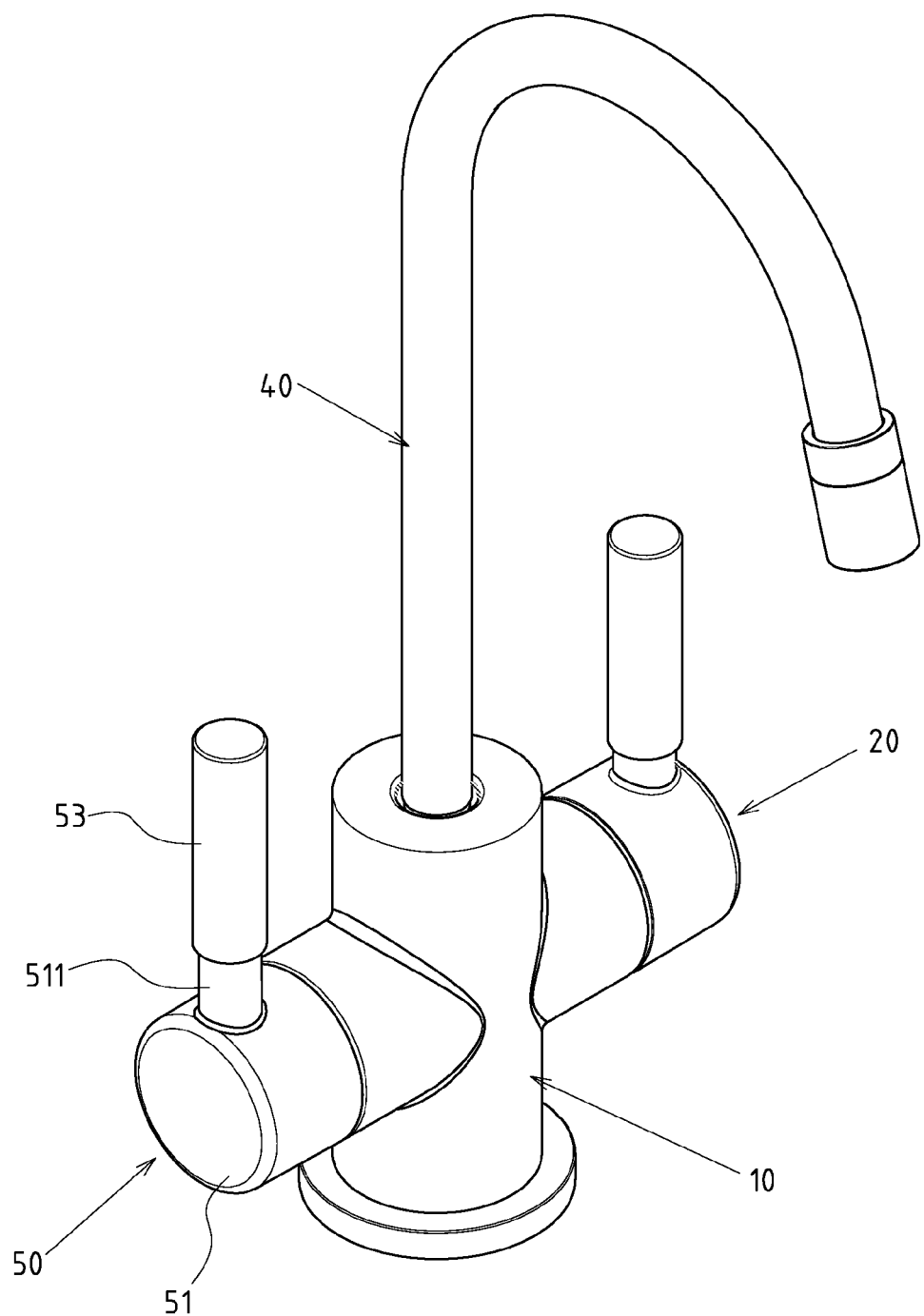
FIG. 1 is a perspective view of a faucet with a safe operating mode on a hot side thereof in accordance with the present invention.
Figure 2:
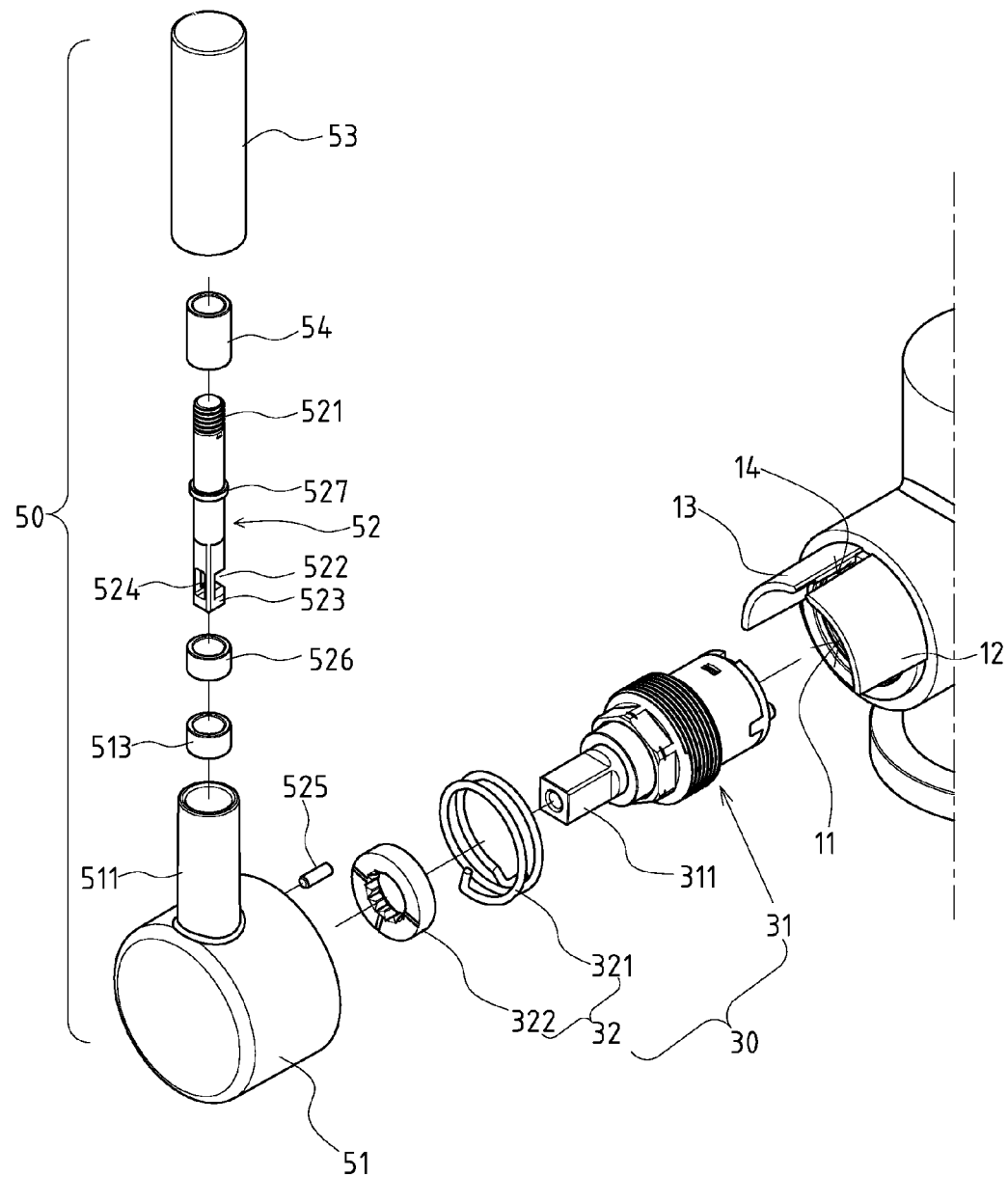
FIG. 2 is a partially exploded perspective view of the faucet in FIG. 1.
Figure 3:
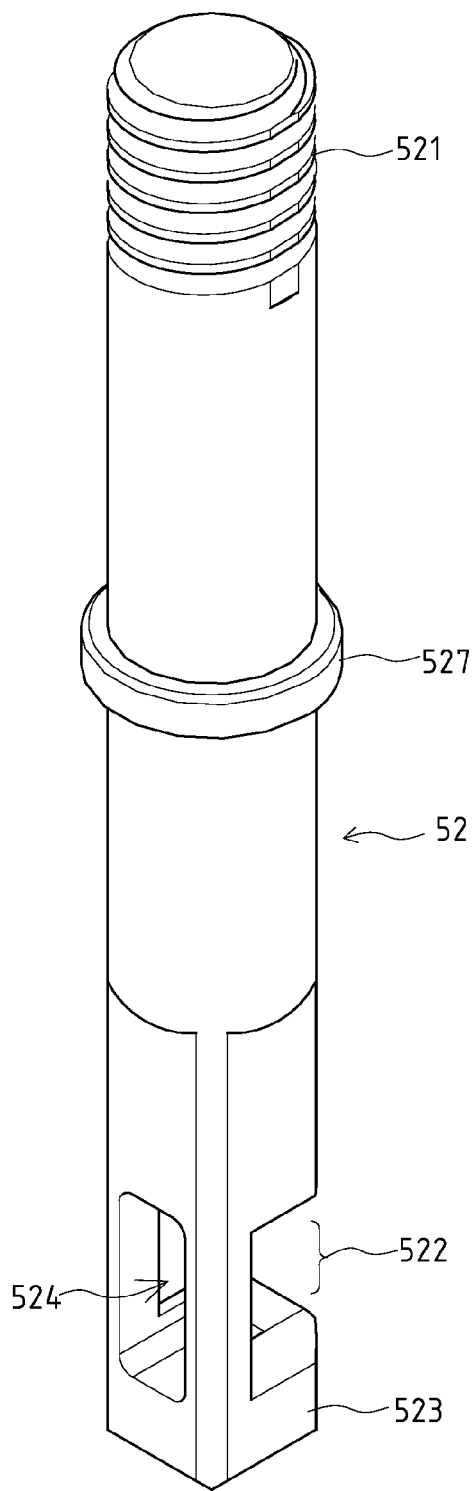
FIG. 3 is a perspective view of a clutch shaft of the faucet in accordance with the present invention.

Referring to the drawings and initially to FIGS. 1-5, a faucet in accordance with the present invention comprises a main body 10, a cold water control device 20 mounted onto a first end of the main body 10, a hot water control device 30 mounted onto a second end of the main body 10 and an outlet device 40 mounted onto a top of the main body 10. The cold water control device 20 selectively guides cold water flowing into the main body 10 and flowing out from the outlet device 40. A drive device 50 is laterally mounted onto the hot water control device 30 for driving the hot water control device 30 to selectively guide hot water flowing into the main body 10 and flowing out from the outlet device 40.

The main body 10 has a threaded hole 11 laterally defined in the second thereof. A first curved plate 12 and a second curved plate 13 respectively laterally extend from the second end of the main body 10. The first curved plate 12 and the second curved plate 13 correspond to each other and form a semi-circle structure surround the threaded hole 11, wherein a slot 14 is defined between the first curved plate 12 and the second curved plate 13.

The hot water control device 30 includes a control valve 31 longitudinally mounted into the threaded hole 11 and a restituting device 32 sleeved on the control valve 31. In the preferred embodiment of the present invention, the control valve 31 is a ceramic valve. A polygonal shaft 311 rotatably extends from the control valve 31 such that the hat water passage (not shown) is opened or closed when the polygonal shaft 311 is rotated. The restituting device 32 is sleeved on the polygonal shaft 311 for providing a restituting force to the polygonal shaft 311 after being rotated. The restituting device 32 includes a coiled spring 321 and a drive element 322 sequentially sleeved on the polygonal shaft 311, wherein the coiled spring 321 has two opposite ends respectively engaged into the control valve 31 and the drive element 322, and the drive element 322 is rotated with the polygonal shaft 311.

The slot 14 provides double-sided engage function to the drive device 50, wherein the first curved plate 12 prevents the drive device 50 from guiding hot water into the main body 10 due to an error operation and the second curved plate 13 prevents the drive device 50 from being overly operated along a reverse direction and damaging the control valve 31. In the preferred embodiment of the present invention, the main body 10 has two curved plates extending therefrom. However, only one the first curved plate 12 also can provide double-sided engage function to the drive device 50 when the control valve 31 has unidirectional elements disposed therein.

The drive device 50 includes a casing 51 laterally and securely mounted onto the polygonal shaft 311 for driving the polygonal shaft 311, wherein the first curved plate 12 and the second curved plate 13 is received in the casing 51. The casing 51 has a tube 511 radially extending from the casing 51, wherein the tube 51 communicates with the interior of the casing 51 and a shoulder 512 is formed on an inner periphery of the tube 511 near the casing 51 for supporting a first magnet 513. In the preferred embodiment of the present invention, the first magnet 513 has a ring structure. A clutch shaft 52 extends through the tube 511 and is reciprocally moved relative to the tube 511. The clutch shaft 52 is selectively engaged to the main body 10 to prevent the drive device 50 from an error operation. The clutch shaft 52 includes an upper end formed with a threaded portion 521, and a lower end having an indentation 522 laterally defined therein and an engaging member 523 extending toward the main body 10, wherein the indentation 522 is provided to received a distal edge of the first curved plate 12 and the engaged member 523 is selectively engaged to the slot 14 or the distal end of the first curved plate 12 to prevent the drive device 50 from rotating the polygonal shaft 311 of the control valve 21 due to an error operation. An elongated hole 524 is defined in a bottom of the indentation 522. A pin 525 extends through the elongated hole 524 and securely inserted into the interior of the casing 51 to prevent the clutch shaft 52 from detaching from the tube 511. A second magnet 526 is disposed on the clutch shaft 52, wherein the first magnet 513 and the second magnet 526 repel each other. The repelled first magnet 513 and the second magnet 526 form a restituting force for the clutch shaft 52 when the clutch shaft 52 inwardly moved relative to the casing 51. In the preferred embodiment of the present invention, the second magnet 526 has a ring structure. The clutch shaft 52 sequentially extends through the second magnet 526 and the first magnet 513 when extending through the tube 511. An annular rib 527 radially extending from the clutch shaft 52 such that the first magnet 513 and the second magnet 526 are limited in a space defined between the shoulder 153 and the annular rib 527. The annular rib 527 pushes the second magnet 526 toward the first magnet 513 when the clutch shaft 52 is inwardly moved relative to the casing 51 for forming the restituting force to the clutch shaft 52. The drive device 50 further includes a tubular element 53 threaded onto the threaded portion 521 of the clutch shaft 52 for user to easily operate the clutch shaft 52, wherein the clutch shaft 52 and the tube 511 are partially received in the tubular element 53. A bushing 54 is sleeved on the first end of the clutch shaft 52 to prevent the clutch shaft 52 from rubbing the inner periphery of the tube 511 and hold the clutch shaft 52 when the clutch shaft 52 is moved.

Figure 4:
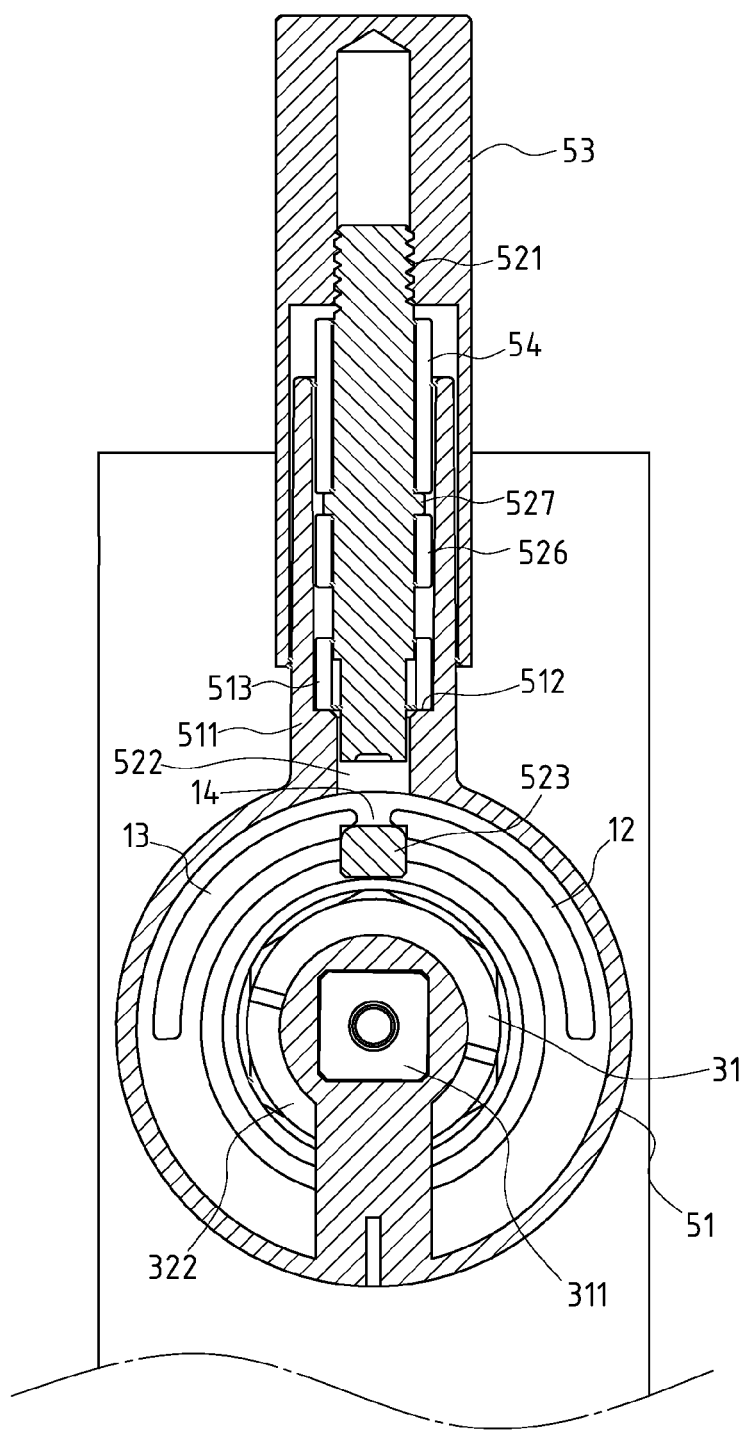
FIG. 4 is a side cross-sectional view of the faucet of the present invention when the clutch shaft is in an engaged position.
Figure 5:
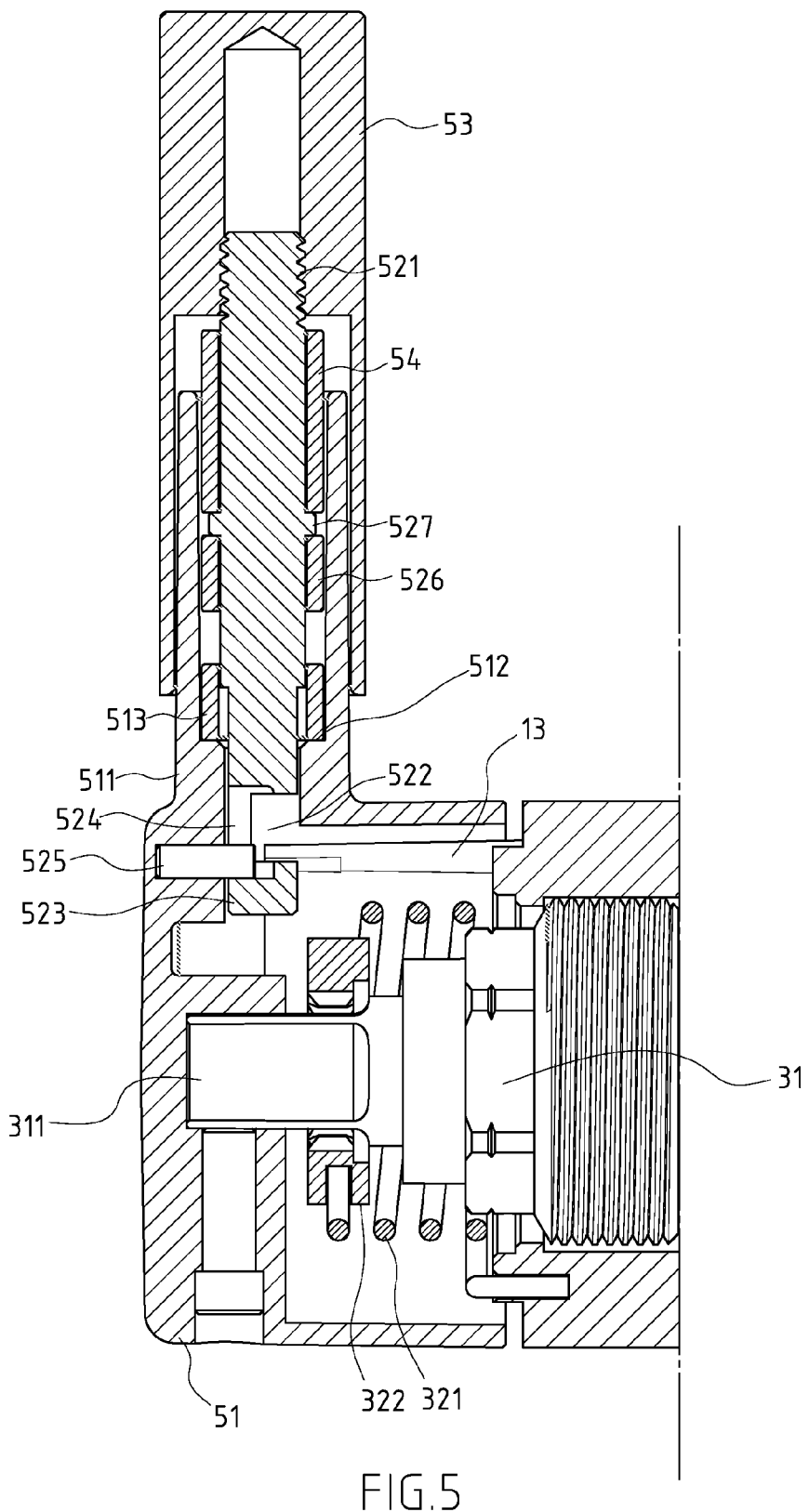
FIG. 5 is a front cross-sectional view of the faucet of the present invention when the clutch shaft is in an engaged position.
Figure 6:
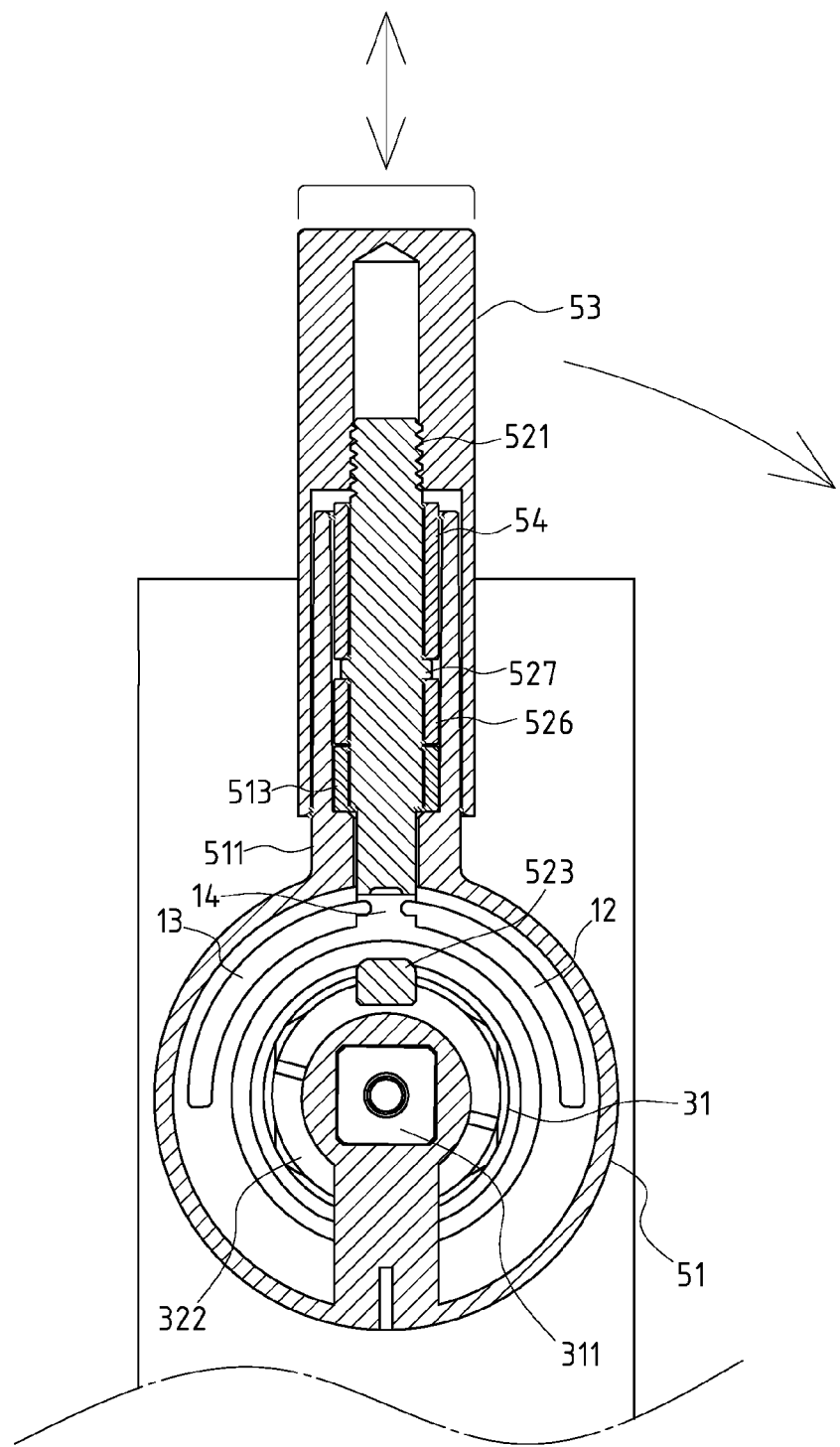
FIG. 6 is a side cross-sectional view of the faucet of the present invention when the clutch shaft is in a free position.
Figure 7:
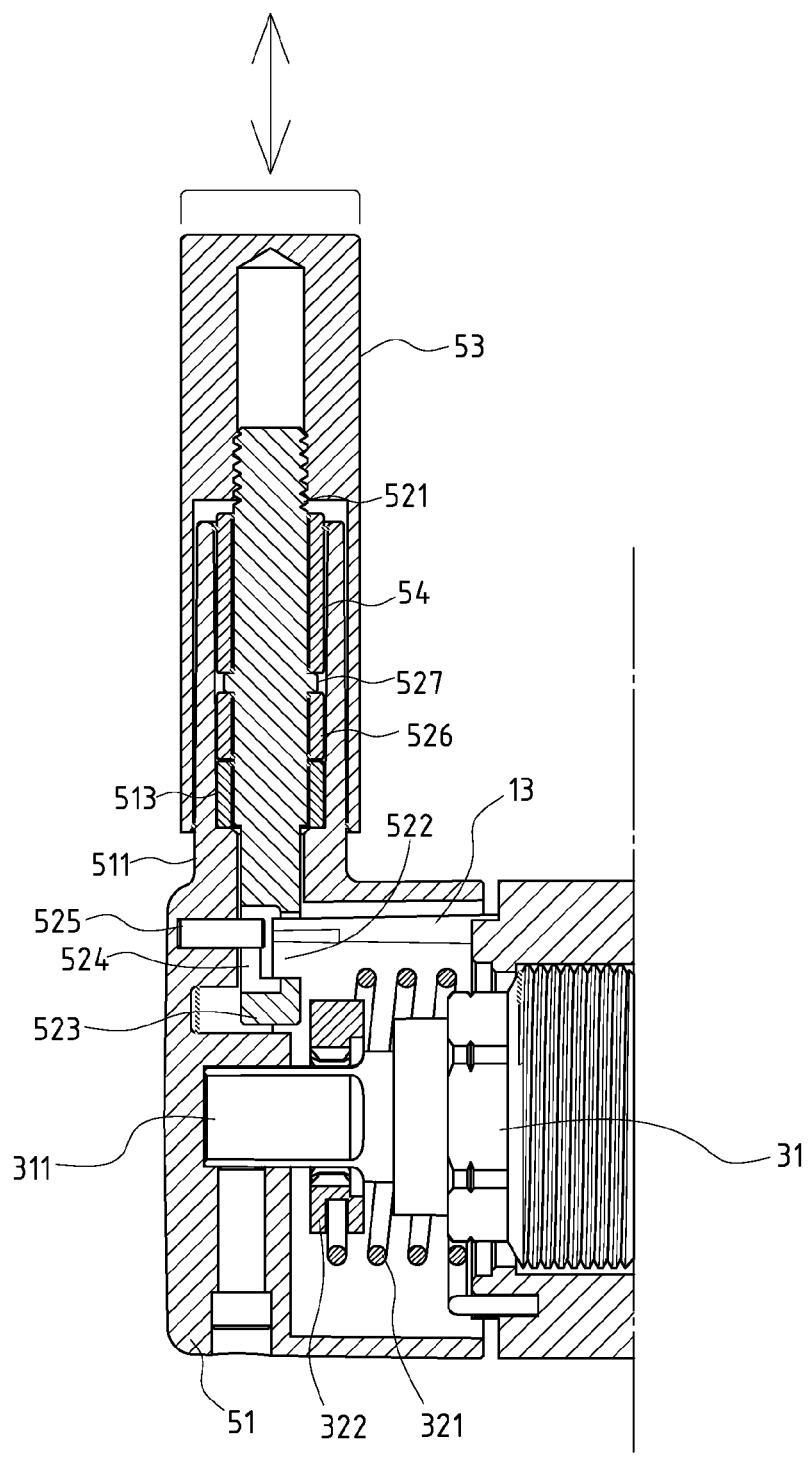
FIG. 7 is a front cross-sectional view of the faucet of the present invention when the clutch shaft is in a free position.
Figure 8:
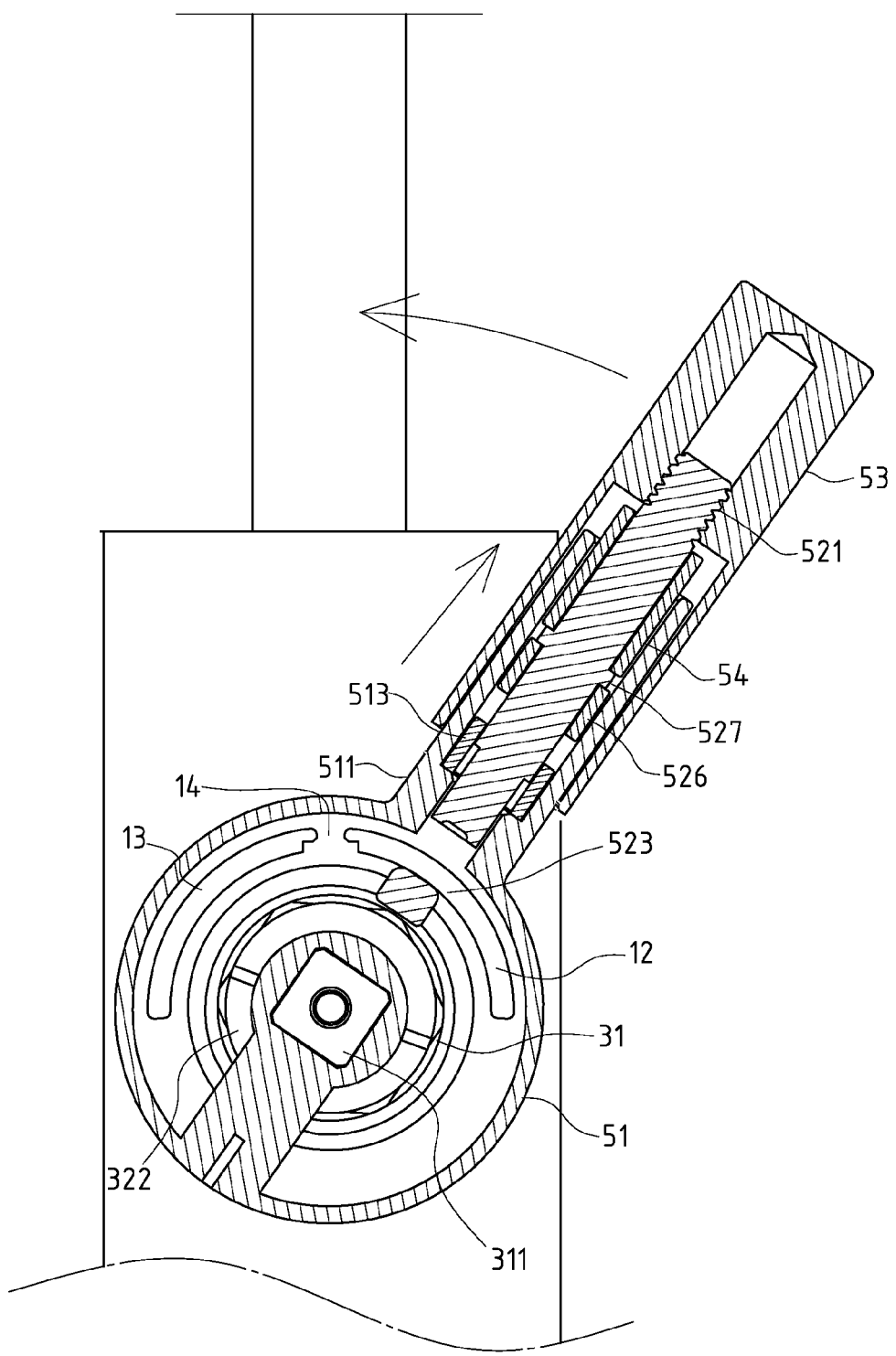
FIG. 8 is an operational view of the faucet in accordance with the present invention.

With reference to FIGS. 4 and 5, when the hot water control device 30 is in a closed condition, the engaging member 523 is engaged to the slot 14 between the first curved plate 12 and the second curved plate 13 such that the drive device 50 is bilaterally limited. As a result, the hot water would not flow out of the outlet device 40 due to an error operation form the drive device 50 and the unidirectional elements in the control valve 31 is protected from being damaged due to an over operation in a reverse direction. With reference to FIGS. 6-8, when using the hot water control device 30 guiding the hot water flowing into the main body 10 and flowing out from the outlet device 40, the clutch shaft 52 is inwardly pushed and the engaging member 523 is disengaged from the first curved plated 12 and the second curved plate 13 such that the distal edges of the first curved plate 12 and the second curved plate 13 is laterally received in the indentation 522, and the second magnet 526 is moved toward the first magnet 513 to enhance the repel force therebetween. At this time, the casing 51 is operated to drive the polygonal shaft 311 of the control valve 31 by the clutch shaft 52 and the tube 511, and the first curved plate 12 extends through the indentation 522 such that the control valve 31 is in a communicated condition and the hot water flows out from the outlet device 40 via the main body 10. The coiled spring 321 is twisted by the drive element 322 when the polygonal shaft 311 is rotated. Consequently, after using hot water, the restitution force of the coiled spring 321 automatically reversely rotates the polygonal shaft 311 and the casing 51 to their original positions and gradually closes the hot water passage in the main body 10. The clutch shaft 52 is gradually moved to its engaging position when the casing 10 is reversely rotated. At this time, the engaging member 523 is moved along the first curved plate 12 due to the repel force between the first magnet 513 and the second magnet 526. With reference to FIG. 5, the repel force between the first magnet 513 and the second magnet 526 reversely pushes the clutch shaft 52 with the engaging member 523 and makes the engaging member 523 engaged to the slot 14 between the first curved plate 12 and the second curved plate 13 to end using hot water when the indentation 523 radially corresponds to the slot 14.

Figure 9:
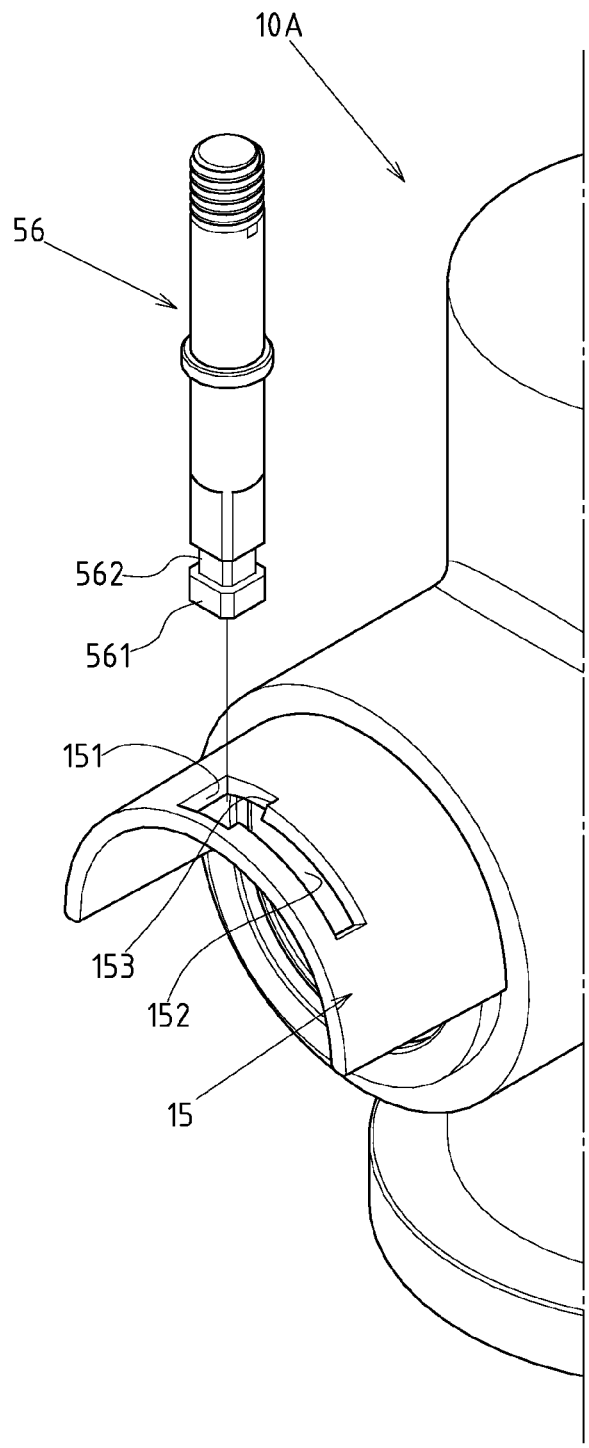
FIG. 9 is a partially exploded perspective view of a second embodiment of the faucet in accordance with the present invention.

With reference to FIG. 9 that shows a second embodiment of the clutch shaft 56 and the main body 10A, in this embodiment, the main body 10A includes a curved plate 15 laterally extending therefrom and received in the casing 51. The curved plate 15 extends along a rotating direction of the drive device 50 and co-axially corresponds to the rotating axis of the drive device 50. A through hole 151 and a groove 152 are respectively defined in the curved plate 15, wherein the groove 152 is longitudinally communicates with the through hole 151. The through hole 151 has a width greater than that of the groove 152 such that at least one shoulder 153 is formed between the through hole 151 and the groove 152. An enlarged head 561 and a neck 562 are respectively and sequentially formed on the second end of the clutch shaft 56, wherein the diameter of the enlarged head 561 is slightly smaller than the width of the through hole 151 and the diameter of the neck 562 is slightly smaller that the width of the groove 152. The drive device 50 is in an engaged condition and cannot be rotated to supply hot water when the enlarged head 561 is received in the through hole 151 and blocked by the at least one shoulder 153. The curved plate 15 provides a non stopping function to the clutch shaft 56 and the drive device 50 can be rotated to make the faucet supplying hot water when the clutch shaft 56 is inwardly pushed, the enlarged head 561 is disengaged from the at least one shoulder 153 and the neck 562 aligns with the grooved 152. The repel force between the first magnet 513 and the second magnet 526 reversely pushes the clutch shaft 56 to make the head 561 received in the through hole 151 again and the clutch shaft 56 is locked again when the clutch shaft 56 is reversely operated and the head 561 aligns with the through hole 151.

Figure 10:
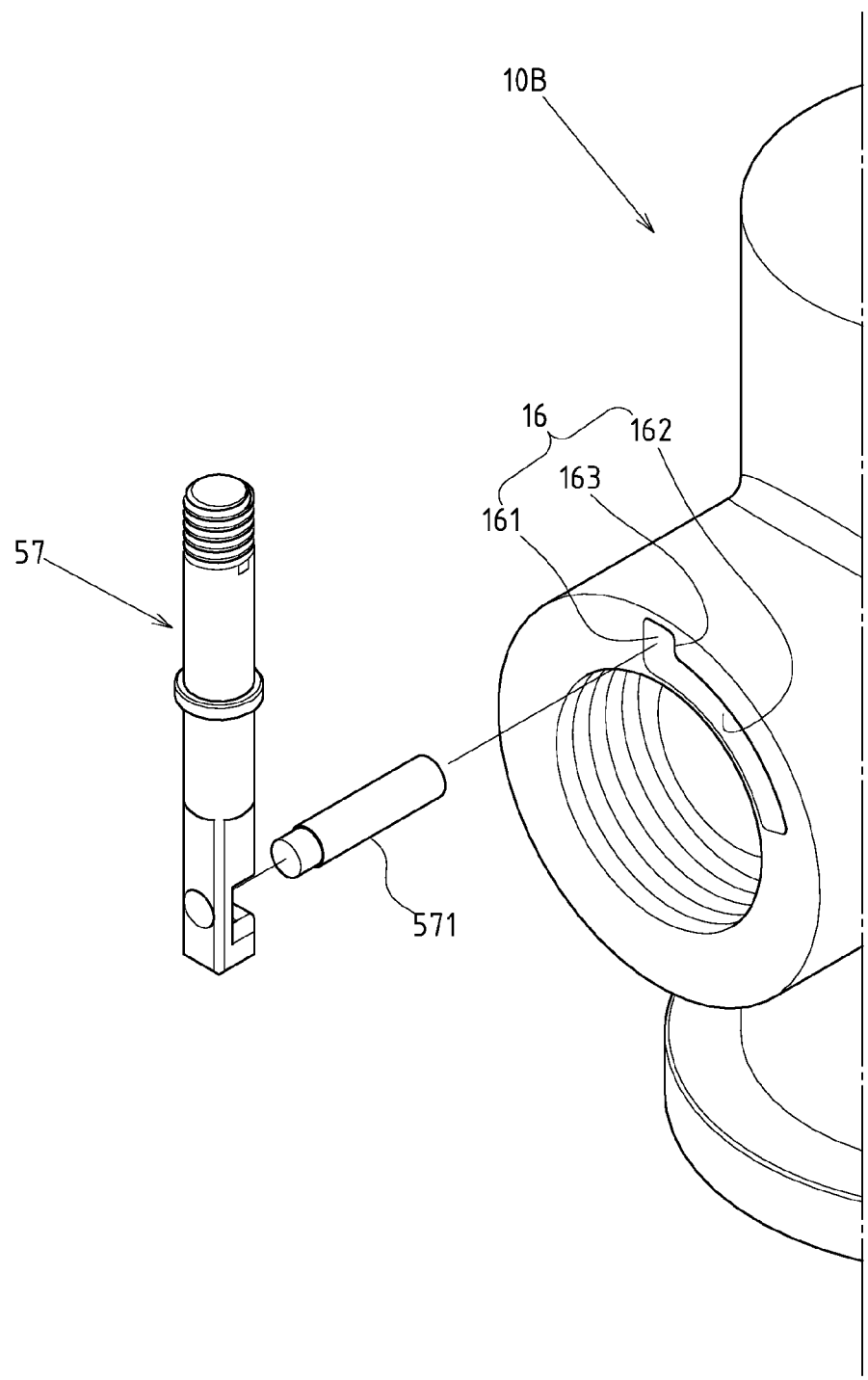
FIG. 10 is a partially exploded perspective view of a third embodiment of the faucet in accordance with the present invention.

With reference to FIG. 10 that shows a third embodiment of the clutch shaft 57 and the main body 10B, in this embodiment, the main body 10B includes one side facing the drive device 50 and having an L-shaped groove 16 laterally defined therein. The L-shaped groove 16 is divided into a receiving portion 161 and a guiding portion 162, wherein a stop portion 163 is formed between the receiving portion 161 and the guiding portion 162. An axle 571 is longitudinally mounted to the second end of the clutch shaft 57, wherein a free end of the axle 571 is received in and moved along the L-shaped groove 16. The axle 571 is blocked by the stop portion 163 to prevent the drive device 50 from an error operation when the axle 571 is moved into the receiving portion 161 due to the repel force between the first magnet 513 and the second magnet 526. The clutch shaft 57 and the axle 571 are in a free condition and the user can rotate the drive device 50 to operate the hot water control device 30 for guiding hot water flowing into the main body 10B when the clutch shaft 57 is inwardly pushed and the axle 571 in moved and corresponds to the guiding portion 162 of the L-shaped groove 16. The repel force between the first magnet 513 and the second magnet 526 reversely pushes the clutch shaft 57 to make the axle 571 received in the receiving portion 161 again when the clutch shaft 57 is reversely operated and the axle 571 aligns with the receiving portion 161 such that the clutch shaft 57 is locked again.

Figure 11:
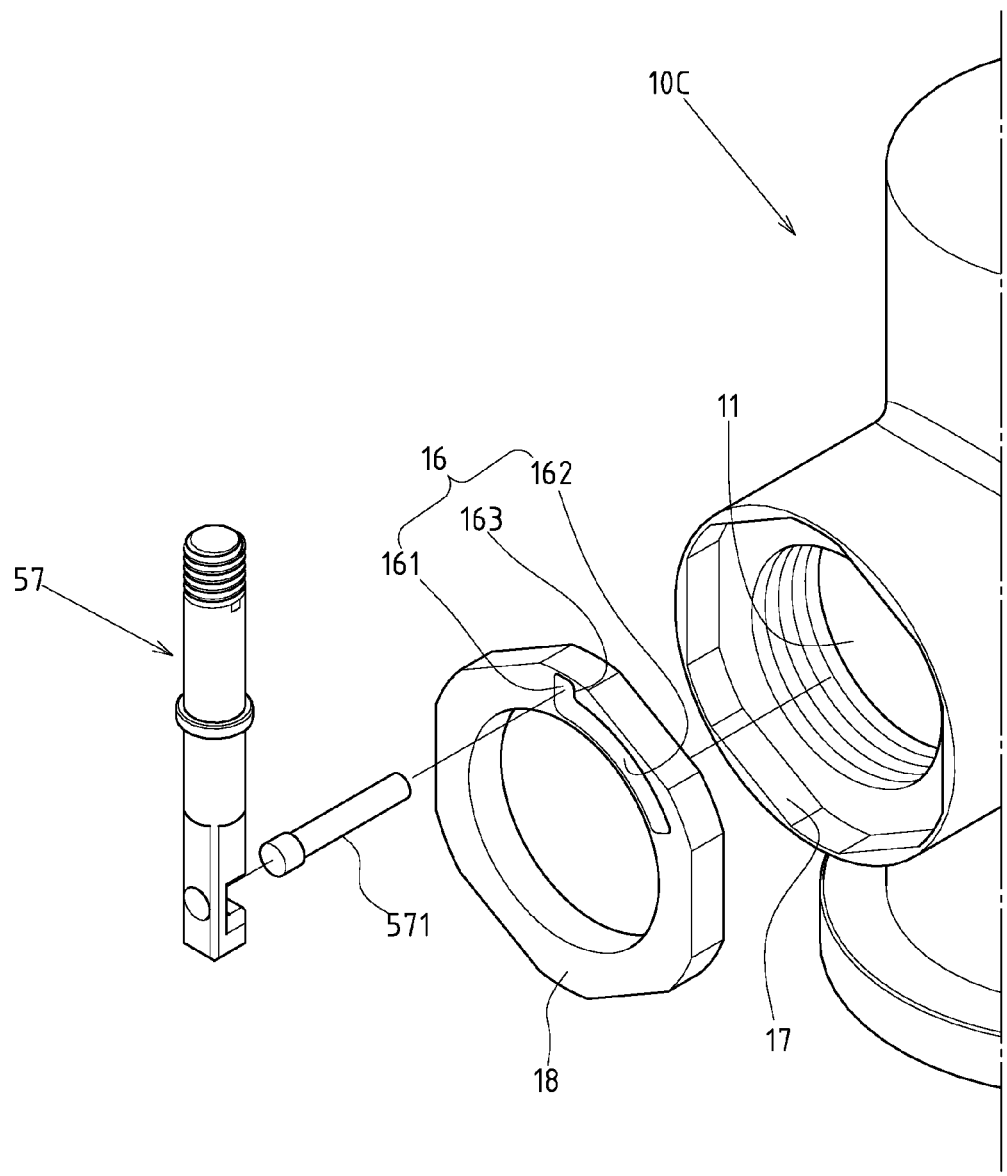
FIG. 11 is a partially exploded perspective view of a fourth embodiment of the faucet in accordance with the present invention.

With reference to FIG. 11 that show a fourth embodiment of the clutch shaft 57 and the main body 10C, in this embodiment, the main body 10C includes one side facing the drive device 50 and having a polygonal recess 17 laterally defined therein, and a ring structure 18 is complementally received in the polygonal recess 17, wherein the L-shaped groove 16 in the third embodiment is laterally defined in the ring structure 18.

As described above, the faucet in accordance with the present invention includes the following advantages.
1. The non-contact (repel) force between the first magnet and the second magnet is provided to the clutch shaft and used as a power source to automatically lock the drive device. Consequently, the conventional spring structure is unnecessary to the drive device of the present invention such that the direct friction between elements is disappeared and the use life of the faucet is lengthened.
2. The clutch shaft is bilaterally locked. In a first direction, the locked clutch shaft can prevent the drive device from an error operation, and in a second direction, the locked clutch shaft can prevent the drive device from an overly reversal operation that may damage the control valve.
3. The coiled spring is twisted when the drive device is rotated such that the clutch shaft automatically moved to its original locked position when the user releases the drive device after using hot water. Consequently, the faucet in accordance with the present invention not only provides a safe control mode but also provides a saving-water control mode.

Although the invention has been explained in relation to its preferred embodiment, it is to be understood that many other possible modifications and variations can be made without departing from the spirit and scope of the invention as hereinafter claimed.

We claim:
1. A facet comprising:
   a main body;
   a cold water control device mounted onto a first end of said main body and adapted to selectively guide cold water flowing into said main body;
   a hot water control device mounted onto a second end of said main body and adapted to selectively guide hot water flowing into said main body;

a outlet device mounted onto a top of said main body and adapted to guide water in said main body flowing out of said main body; and a drive device laterally mounted onto said hot water control device and driving said hot water control device so as to selectively guide hot water flowing into said main body and flowing out from said outlet device, said hot water control device having a control valve longitudinally mounted into said main body and a polygonal shaft rotatably extending from said control valve such that a hot water passage opens or closes when said polygonal shaft is rotated, said drive device having a casing laterally and securely mounted onto said polygonal shaft so as to drive said polygonal shaft, said casing having a tube radially extending from said casing and communicating with an interior of said casing, said tube having a magnet secured therein, said tube having a clutch shaft extending therethrough that is reciprocally movable relative to said tube, said clutch shaft selectively engaged to said main body so as to prevent an error operation of said drive device, said clutch shaft having a second magnet disposed thereon, said first magnet and said second magnet arranged so as to repel each other so as to form a restituting force for said clutch shaft when said clutch shaft is moved inwardly relative to said casing, said casing being freely rotated so as to drive said polygonal shaft so as to guide hot water flowing into said main body when said clutch shaft is disengaged from said main body, said clutch shaft being automatically engaged to said main body by a repel force between said first magnet and said second magnet when said clutch shaft is moved to an original position.

2. The faucet of claim 1, wherein said first magnet and said second magnet are two ring structures and a lower end of said clutch shaft sequentially extends through said second magnet and said first magnet, said casing having a shoulder formed on an inner periphery thereof near said casing for supporting said first magnet, said clutch shaft having an annular rib radially extending from said clutch shaft for stopping said second magnet such that said first magnet and said second magnet are limited in a space defined between said shoulder and said annular rib, wherein said annular rib pushes said second magnet toward said first magnet when said clutch shaft is inwardly moved relative to said casing for forming the restituting force to said clutch shaft due to therepel force between said first magnet and said second magnet.

3. The faucet of claim 1, wherein said main body has a first curved plate laterally extending therefrom and co-axially corresponding to a rotating axis of said drive device, said clutch shaft has a lower end having an indentation laterally defined therein and an engaging member extending toward said main body, wherein said indentation receives a distal edge of said first curved plate and said engaging member is selectively engaged to a distal end of said first curved plate to prevent said drive device from rotating said polygonal shaft of said control valve due to an error operation.

4. The faucet of claim 2, wherein said main body has a first curved plate laterally extending therefrom and co-axially corresponding to a rotating axis of said drive device, said clutch shaft has a lower end having an indentation laterally defined therein and an engaging member extending toward said main body, wherein said indentation receives a distal edge of said first curved plate and said engaging member is selectively engaged to a distal end of said first curved plate to prevent said drive device from rotating said polygonal shaft of said control valve due to an error operation.

5. The faucet of claim 3, wherein said main body has a second curved plate laterally extending therefrom, said first curved plate and said second curved plate corresponding to each other and forming a semi-circle structure, a slot is defined between said first curved plate and said second curved plate, wherein said engaging member is selectively and bilaterally engaged to said slot.

6. The faucet of claim 4, wherein said main body has a second curved plate laterally extending therefrom, said first curved plate and said second curved plate corresponding to each other and forming a semi-circle structure, a slot is defined between said first curved plate and said second curved plate, wherein said engaging member is selectively and bilaterally engaged to said slot.

7. The faucet of claim 5, wherein said drive device has a tubular element mounted onto a top end of said clutch shaft, wherein said clutch shaft and said tube are partially received in said tubular element, a bushing is sleeved on said first end of said clutch shaft so as to prevent said clutch shaft from rubbing an inner periphery of said tube and to hold said clutch shaft when said clutch shaft is moved.

8. The faucet of claim 1, wherein said drive device has a tubular element mounted onto a top end of said clutch shaft, wherein said clutch shaft and said tube are partially received in said tubular element, a bushing is sleeved on a first end of said clutch shaft to prevent said clutch shaft from rubbing an inner periphery of said tube and to hold said clutch shaft when said clutch shaft is moved.

9. The faucet of claim 1, wherein said main body has a curved plate laterally extending therefrom and received in said casing, said curved plate extending along a rotating direction of said drive device and co-axially corresponding to a rotating axis of said drive device, a through hole and a groove are respectively defined in said curved plate, wherein said groove longitudinally communicates with said through hole and said through hole has a width greater than a width of said groove such that at least one shoulder is formed between said through hole and said groove, an enlarged head and a neck are respectively and sequentially formed on a lower end of said clutch shaft, wherein a diameter of said enlarged head is slightly smaller than the width of said through hole and a diameter of said neck is slightly smaller that the width of said groove, said drive device is in an engaged condition and cannot be rotated to supply hot water when said enlarged head is received in said through hole and blocked by said at least one shoulder.

10. The faucet of claim 2, wherein said main body has a curved plate laterally extending therefrom and received in said casing, said curved plate extending along a rotating direction of said drive device and co-axially corresponding to a rotating axis of said drive device, a through hole and a groove are respectively defined in said curved plate, wherein said groove longitudinally communicates with said through hole and said through hole has a width greater than a width of said groove such that at least one shoulder is formed between said through hole and said groove, an enlarged head and a neck are respectively and sequentially formed on a lower end of said clutch shaft, wherein a diameter of said enlarged head is slightly smaller than the width of said through hole and a diameter of said neck is slightly smaller than the width of said groove, said drive device being in an engaged condition and cannot be rotated to supply hot water when said enlarged head is received in said through hole and blocked by said at least one shoulder.

11. The faucet of claim 5, wherein said drive device includes a tubular element mounted onto a top end of said clutch shaft, wherein said clutch shaft and said tube are partially received in said tubular element, a bushing is sleeved on a first end of said clutch shaft to prevent said clutch shaft from rubbing an inner periphery of said tube and to hold said clutch shaft when said clutch shaft is moved.

12. The faucet of claim 10, wherein said drive device has a tubular element mounted onto a top end of said clutch shaft, wherein said clutch shaft and said tube are partially received in said tubular element, a bushing is sleeved on a first end of said clutch shaft to prevent said clutch shaft from rubbing an inner periphery of said tube and to hold said clutch shaft when said clutch shaft is moved.

13. The faucet of claim 1, wherein said main body has one side facing said drive device and has an L-shaped groove laterally defined therein, said L-shaped groove divided into a receiving portion and a guiding portion, wherein a stop portion is formed between said receiving portion and said guiding portion, an axle is longitudinally mounted to a lower end of said clutch shaft, wherein a free end of said axle is received in and moved along said L-shaped groove, said axle is selectively blocked by said stop portion to prevent said drive device from an error operation when said axle is moved into said receiving portion due to the repel force between said first magnet and said second magnet, said clutch shaft and said axle being in a free condition so that a user can rotate said drive device to operate said hot water control device for guiding hot water flowing into said main body when said clutch shaft is inwardly pushed and said axle is moved and corresponds to said guiding portion of said L-shaped groove.

14. The faucet of claim 2, wherein said main body has one side facing said drive device and having an L-shaped groove laterally defined therein, said L-shaped groove divided into a receiving portion and a guiding portion, wherein a stop portion is formed between said receiving portion and said guiding portion, an axle is longitudinally mounted to a lower end of said clutch shaft, wherein a free end of said axle is received in and moved along said L-shaped groove, said axle is selectively blocked by said stop portion to prevent said drive device from an error operation when said axle is moved into said receiving portion due to the repel force between said first magnet and said second magnet, said clutch shaft and said axle being in a free condition such that a user can rotate said drive device to operate said hot water control device for guiding hot water flowing into said main body when said clutch shaft is inwardly pushed and said axle is moved and corresponds to said guiding portion of said L-shaped groove.

15. The faucet of claim 13, wherein said drive device has a tubular element mounted onto a top end of said clutch shaft, wherein said clutch shaft and said tube are partially received in said tubular element, a bushing is sleeved on a first end of said clutch shaft to prevent said clutch shaft from rubbing an inner periphery of said tube and to hold said clutch shaft when said clutch shaft is moved.

16. The faucet of claim 14, wherein said drive device has a tubular element mounted onto a top end of said clutch shaft, wherein said clutch shaft and said tube are partially received in said tubular element, a bushing is sleeved on a first end of said clutch shaft to prevent said clutch shaft from rubbing an inner periphery of said tube and to hold said clutch shaft when said clutch shaft is moved.

17. The faucet of claim 1, wherein said main body has one side facing said drive device and has a polygonal recess laterally defined therein, a ring structure is complementally received in said polygonal recess and an L-shaped groove is laterally defined in said ring structure, said L-shaped groove divided into a receiving portion and a guiding portion, wherein a stop portion is formed between said receiving portion and said guiding portion, an axle longitudinally mounted to a lower end of said clutch shaft, wherein a free end of said axle is received in and moved along said L-shaped groove, said axle is selectively blocked by said stop portion to prevent said drive device from an error operation when said axle is moved into said receiving portion due to said repel force between said first magnet and said second magnet, said clutch shaft and said axle being in a free condition such that a user can rotate said drive device to operate said hot water control device for guiding hot water flowing into said main body when said clutch shaft is inwardly pushed and said axle is moved and corresponds to said guiding portion of said L-shaped groove.

18. The faucet of claim 2, wherein said main body has one side facing said drive device and has a polygonal recess laterally defined therein, a ring structure complementally received in said polygonal recess and an L-shaped groove is laterally defined in said ring structure, said L-shaped groove is divided into a receiving portion and a guiding portion, wherein a stop portion is formed between said receiving portion and said guiding portion, an axle is longitudinally mounted to a lower end of said clutch shaft, wherein a free end of said axle is received in and moved along said L-shaped groove, said axle selectively blocked by said stop portion to prevent said drive device from an error operation when said axle is moved into said receiving portion due to the repel force between said first magnet and said second magnet, said clutch shaft and said axle being in a free condition such that a user can rotate said drive device to operate said hot water control device for guiding hot water flowing into said main body when said clutch shaft is inwardly pushed and said axle is moved and corresponds to said guiding portion of said L-shaped groove.

19. The faucet of claim 17, wherein said drive device has a tubular element mounted onto a top end of said clutch shaft, wherein said clutch shaft and said tube are partially received in said tubular element, a bushing is sleeved on a first end of said clutch shaft to prevent said clutch shaft from rubbing an inner periphery of said tube and to hold said clutch shaft when said clutch shaft is moved.

20. The faucet of claim 18, wherein said drive device has a tubular element mounted onto a top end of said clutch shaft, wherein said clutch shaft and said tube are partially received in said tubular element, a bushing is sleeved on a first end of said clutch shaft to prevent said clutch shaft from rubbing an inner periphery of said tube and to hold said clutch shaft when said clutch shaft is moved.

* * * * *